United States Patent [19]
Okaya

[11] Patent Number: 5,808,663
[45] Date of Patent: Sep. 15, 1998

[54] MULTIMEDIA CAROUSEL FOR VIDEO CONFERENCING AND MULTIMEDIA PRESENTATION APPLICATIONS

[75] Inventor: Ken Okaya, Austin, Tex.

[73] Assignee: Dell Computer Corporation, Round Rock, Tex.

[21] Appl. No.: 785,584

[22] Filed: Jan. 21, 1997

[51] Int. Cl.$^6$ .............................. H04N 7/15; H04M 11/00
[52] U.S. Cl. ...................... 348/15; 348/373; 379/93.21; 379/110.01
[58] Field of Search ............................... 348/14–20, 373, 348/375, 552; 379/53, 54, 90.01, 93.17, 93.21, 110.01, 419, 428, 434; H04N 7/15

[56] References Cited

U.S. PATENT DOCUMENTS 3,233,346  2/1966  Cornberg ................................. 348/15
4,758,887  7/1988  Engel et al. .............................. 348/15
5,568,963  10/1996  Bennett et al. .

*Primary Examiner*—Wing F. Chan
*Attorney, Agent, or Firm*—Haynes and Boone, L.L.P.

[57] ABSTRACT

A multimedia carousel for use in video conferencing and multimedia presentation applications is disclosed. The multimedia carousel includes a cube-shaped media unit rotatably disposed on a stationary base. Each of the four outwardly facing sides of the media unit is equipped with an active color matrix display, a voice-activated charge coupled device ("CCD") camera and a microphone. A single high fidelity speaker is disposed on the top side surface of the cube for producing high quality audio output.

25 Claims, 3 Drawing Sheets

MULTIMEDIA CAROUSEL FOR VIDEO CONFERENCING AND MULTIMEDIA PRESENTATION APPLICATIONS

TECHNICAL FIELD

In one embodiment, the invention relates generally to video conferencing and multimedia presentation applications and, more particularly, to an integrated multimedia carousel for use in such applications.

BACKGROUND

Face-to-face conversation is generally recognized as the preferred form of interpersonal communication. It is therefore not surprising that for decades this fact has been the impetus for the development of video conferencing systems. In a typical video conferencing, or teleconferencing, system, one or more terminals, each equipped with video equipment, i.e., a video camera and a display device, and audio equipment, i.e., a microphone and one or more speakers, are connected by telecommunications links to permit persons in remote locations to conduct face-to-face conversations.

There are obvious benefits to video conferencing; for example, it reduces or eliminates the need for time consuming and expensive business travel. Moreover, video conferencing facilitates interactive, face-to-face communication in situations where it would otherwise have been impossible, such as when travel is impossible and a telephone call too impersonal. In many cases, a video conference is the most effective and efficient method of information exchange. Since many business have come to depend on the exchange of information in order to carry out their basic operations, it has become desirable for such businesses to utilize video conferencing whenever possible.

Another area in which interpersonal communications have been enhanced over the past several decades is in the use of multimedia to present information in an attractive and interesting form. In the most basic sense, multimedia is the combination of multiple forms of media in the communication of information. Multimedia enables people to communicate using integrated media, such as audio, video, text and graphics. The obvious benefit is more effective communication. The combination of several media often provides a richer, more effective communication tool than a single medium, such as traditional text-based communication.

In this regard, multimedia computers and associated applications have been developed to enable simultaneous voice, image, data and video applications to be run on a computer. As indicated above, the use of multimedia presentations often enhances the communicative power of the presentation.

In the past, presentations have been made using transparencies and overhead projectors or slides and slide projectors to project images on a screen for viewing by an audience. More recently, overhead display projectors and LCD projectors designed to integrate with a computer and to display the contents of the computer's display onto a screen for viewing by an audience have been used. While such apparatus facilitate the use of multimedia in presentations, they are expensive and do not facilitate a "round table" type setting as opposed to an auditorium type setting.

Similarly, the facilities now available for video conferencing also do not facilitate "round table" type settings, as participants must be sitting in view of both the camera and the display device in order to be seen at the remote video conferencing terminal and to view the person being shown on the local display device.

Accordingly, what is needed is an apparatus for facilitating a round table approach to video conferencing and multimedia presentation applications.

SUMMARY

One embodiment of the invention is a multimedia carousel for use in video conferencing and multimedia presentation applications. In a preferred embodiment, the multimedia carousel includes a cube-shaped media unit rotatably disposed on a stationary base. Each of the four outwardly facing sides of the media unit is equipped with an active color matrix display, a voice-activated charge coupled device ("CCD") camera and a microphone. A single high fidelity speaker is disposed on the top side surface of the cube for producing high quality audio output.

In an alternative embodiment, the media unit includes three, rather than four sides, making it more suitable for smaller groups of persons and further reducing the cost of the system by eliminating one display, one camera and one microphone. In another alterative embodiment, the sides of the media unit are hinged, such that all of the displays can be viewed at once, for example, where all of the participants are located on one side of the multimedia carousel.

A technical advantage achieved is that the multimedia carousel is much less expensive than other means for enabling the same functions, such as LCD projectors.

Another technical advantage achieved is that it facilitates round table presentation of both video conferencing and multimedia presentation applications such that local participants can remain within the line-of-sight of other local participants at all times during the conference and/or presentation.

Yet another technical advantage achieved is that it is highly portable and utilizes many of the same materials used by notebook computer and camcorder manufacturers.

DESCRIPTION OF THE PREFERRED EMBODIMENT

Figure 1:
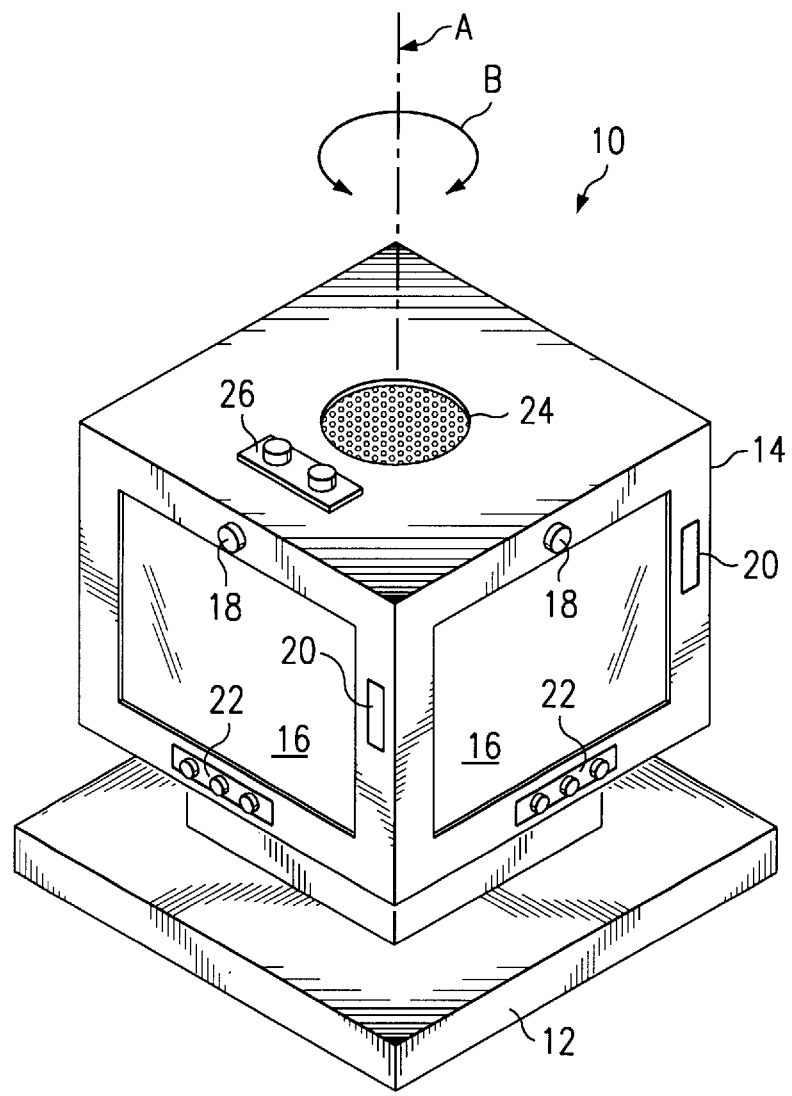
FIG. 1 is a perspective view of one embodiment of the multimedia carousel.

FIG. 1 is a perspective view of one embodiment of a multimedia carousel 10. As shown in FIG. 1, the multimedia carousel 10 includes a base 12 and a media unit 14 connected to the base 12 such that it is freely rotatable about a vertical axis A through the center of the media unit 14 and the base 12 as indicated by an arrow B. Each of four outwardly facing sides of the media unit 14, only two of which are shown in FIG. 1, includes a display panel 16, a camera 18 and a microphone 20. In addition, each of the four outwardly facing sides of the media unit 14 also includes a display control panel 22 having several control buttons for controlling various aspects of the associated display panel 16. A single surround sound quality speaker 24 is disposed on a top side of the media unit 14 for producing quality audio output. An audio control panel 26 including several buttons or knobs for controlling various qualities of the speaker audio output, such as volume, is disposed proximate the speaker 24. In the preferred embodiment, the cameras 18 are voice-activated CCD cameras, while the display panels 16 are active matrix displays.

Figure 2:
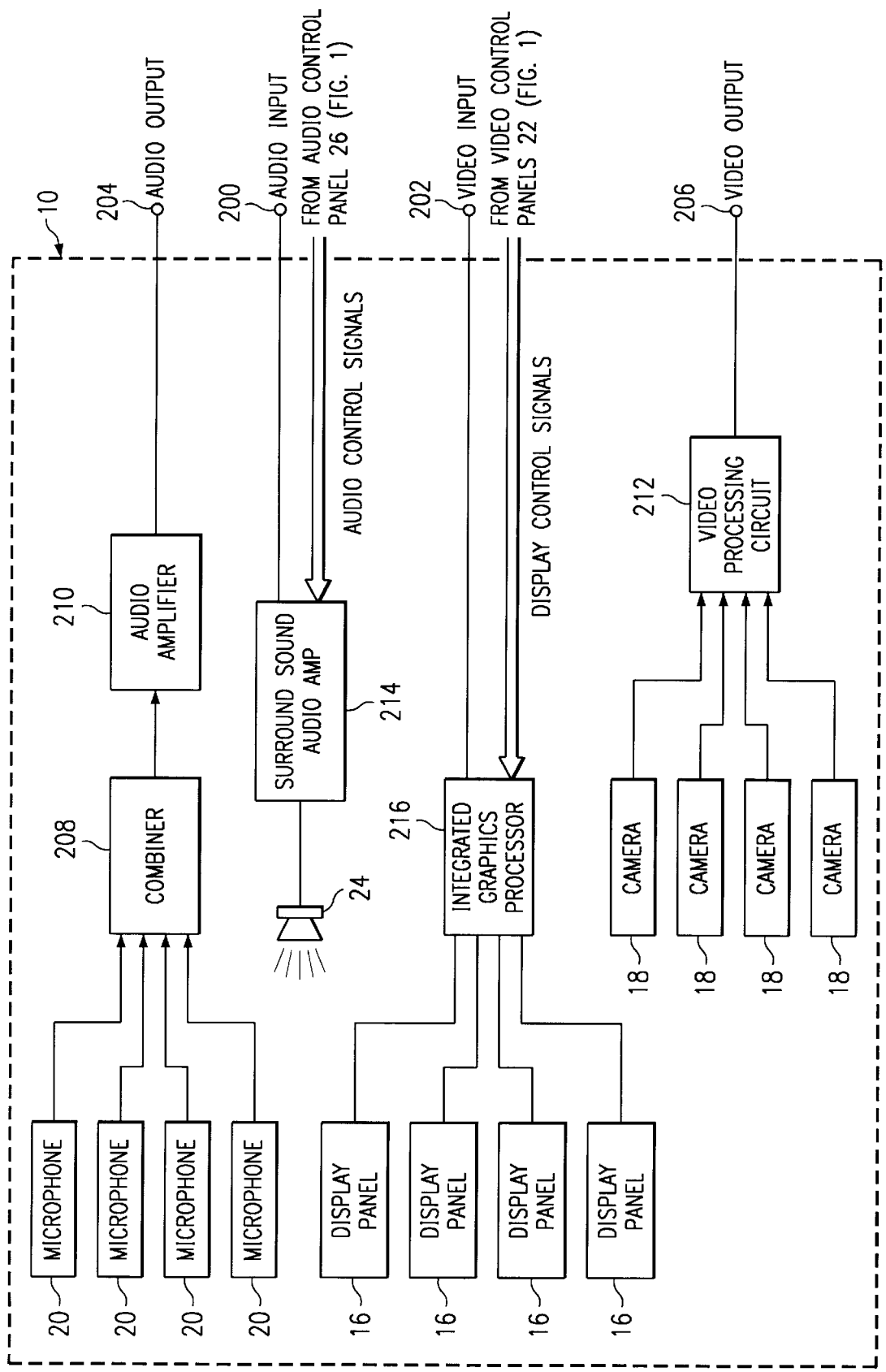
FIG. 2 is a system block diagram of the multimedia carousel of FIG. 1.

Referring now to FIG. 2, it will be recognized that the multimedia carousel 10 includes several input and output terminals for integrating with a multimedia computer or video conferencing system. In particular, the multimedia carousel 10 includes an audio input terminal 200 for receiving audio input for output via the speaker 24, a video input terminal 202 for receiving video input for display on the display panels 16, an audio output terminal 204 through which audio signals from the microphones 20 are made available, and a video output terminal 206 through which video signals produced by the cameras 18 are made available.

The operation of the multimedia carousel 10 will now be described in greater detail. As shown in FIG. 2, audio signals produced by the microphones 20, representing speech signals from local participants, are input into a combiner 208, which combines the audio signals into a single integrated signal, and then to an audio amplifier 210, which amplifies the integrated audio signal, before being made available at the audio output terminal 204 to, e.g., a video conferencing system (not shown).

Similarly, video signals from the cameras 18 are processed as necessary by a video processing circuit 212 and then made available at the video output terminal 206 to, e.g., a video conferencing system (not shown).

Audio signals received at the audio input terminal 200 from, e.g., a computer executing a multimedia application (not shown) or a video conferencing system (not shown), are input to a surround sound audio amplifier 214 and processed in accordance with audio control signals from the audio control panel 26 (FIG. 1) before being provided to the speaker 24 (FIG. 1). Similarly, video signals received at the video input terminal 202 from, e.g., a computer executing a multimedia application (not shown) or a video conferencing system (not shown), are processed by an integrated graphics processor 216 in accordance with video control signals from the display control panels 22 (FIG. 1) before being provided to the display panels 16 for display thereon. In this manner, video and audio output produced by a multimedia computer or received from a remote video conferencing terminal can be displayed and broadcast using the multimedia carousal 10 to participants seated around the carousel.

One scenario in which the multimedia carousel 10 might be especially useful is one in which a product team would like to make a formal proposal to an outside vendor regarding a new product. One member of the product team comes to the meeting with a presentation of the outline of the proposal prepared using a multimedia application such as PowerPoint. Using the multimedia carousel 10 in conjunction with her notebook PC, which is connected to the video input terminal 202 and audio input terminal 200 via its video and audio I/O ports, respectively, she makes her presentation to the product team seated around the multimedia carousel 10. The team members discuss, make changes and, in general, get "on the same page" regarding the proposal they would like to make. Once they have accomplished this, the product team calls up the outside vendor using their Zoom Video or plain old telephone system ("POTS") video conferencing card and/or peripheral. The product team then presents their product to the vendor via a video conferencing system. After the presentation, the cameras 18 are switched on and the proposal is discussed. The product team's leader speaks first, triggering the camera 18 in front of him, and his image instantly appears on the vendor's display panel (not shown). At any time during the discussion or presentation, the media unit 14 may be rotated relative to the base 12 to enable participants to get a better view of what is being presented on the display panels 16 or to ensure that particular participants are within the line of sight of one of the cameras 18. The discussion continues as other members of the product team make additional comments, triggering the camera 18 closest to the speaker such that that team member's image is displayed on the vendor's display panel. In this manner, the voice-activated cameras 18 capture it all.

Alternatively, if the cameras 18 are not voice-activated, the images captured by all of the cameras 18 could be simultaneously displayed in a "split screen" type of arrangement on the vendor's display panel. Still further, even assuming voice-activated cameras are used, a sort of split screen format could still be used, with the current speaker's image taking up a larger area of the vendor's display screen than the images captured by the other cameras.

Figure 3A:
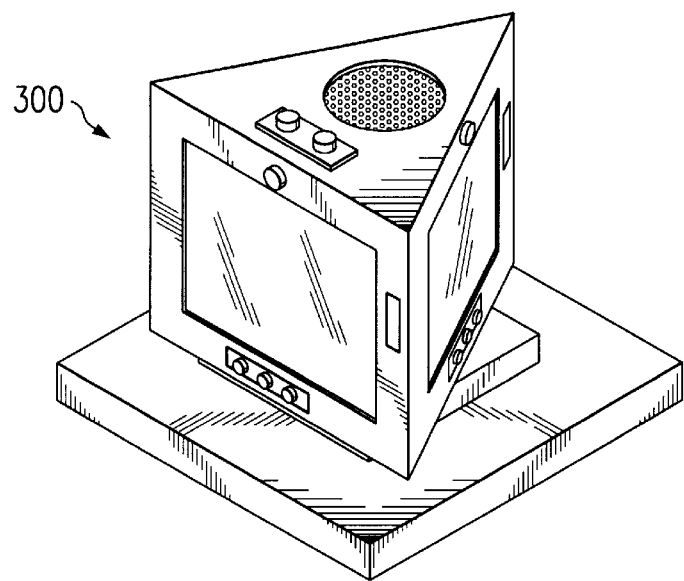
FIGS. 3A and 3B respectively illustrate alternative embodiments of the multimedia carousel.
Figure 3B:
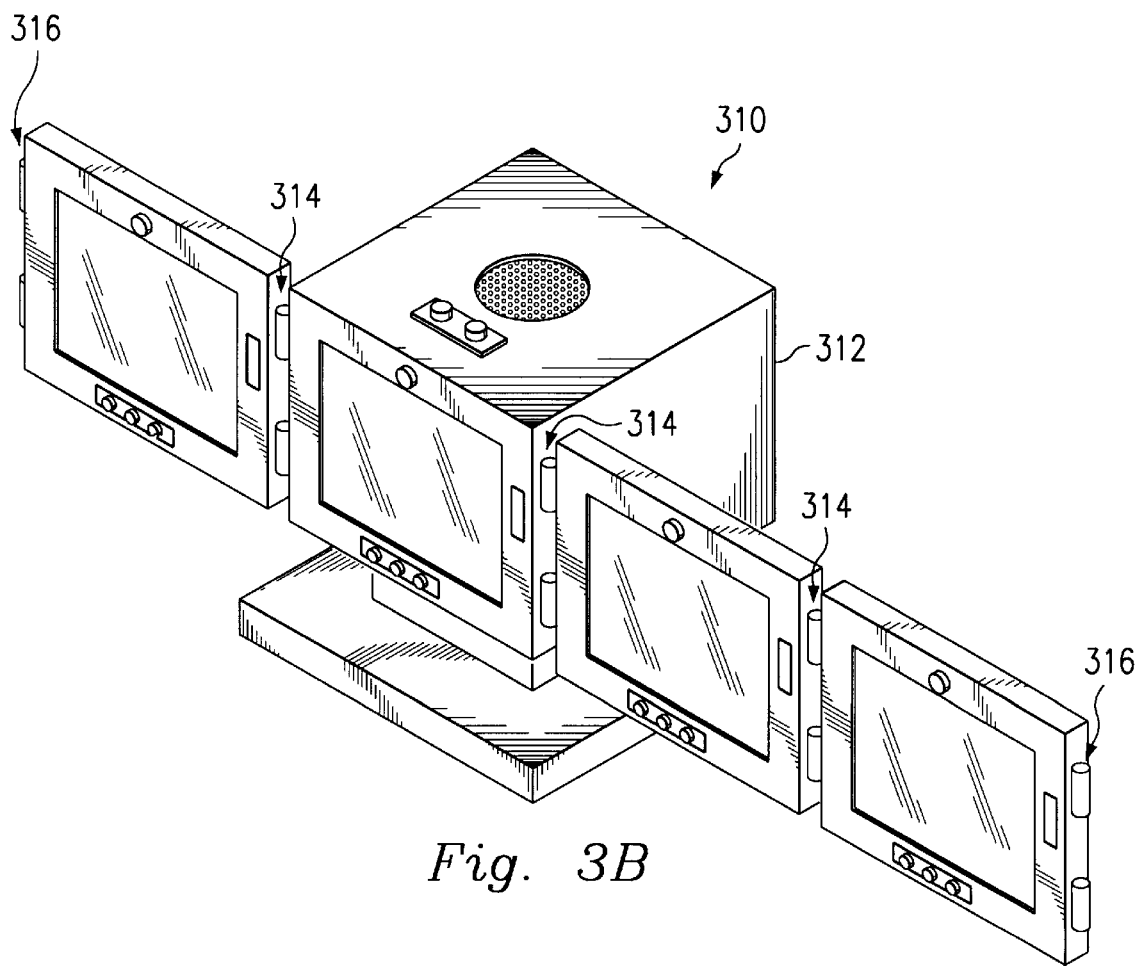

FIGS. 3A and 3B illustrate alternative embodiments of the multimedia carousel 10. In particular, a three-sided multimedia carousel 300 shown in FIG. 3A is identical to the multimedia carousel 10 of FIG. 1, except that it has only three, rather than four, outwardly facing sides and hence has only three, rather than four, display panels, microphones, and cameras. Accordingly, the multimedia carousel 300 is less expensive than the multimedia carousel 10 and is more appropriate for smaller groups, as it has fewer display panels and hence less display area.

A hinged multimedia carousel 310 is illustrated in FIG. 3B and is identical to the multimedia carousel 10 of FIG. 1, except that the outwardly facing sides of a media unit 312 of the carousel 310 are connected together via hinges 314 along three corners of the unit 312 and via one or more latching mechanisms 316 along the remaining corner such that all four of the display panels thereof can be viewed at once, as shown in FIG. 3B.

Although illustrative embodiments of the invention have been shown and described, other modifications, changes, and substitutions are intended in the foregoing disclosure. Accordingly, it is appropriate that the appended claims be construed broadly and in a manner consistent with the scope of the invention.

What is claimed is:

1. A multimedia carousel comprising:
   a base;
   a media unit connected to said base and having a plurality of outwardly facing sides and a top surface, said media unit further comprising a display panel, a microphone and a camera disposed on each of said outwardly facing sides and a speaker disposed on said top surface; and
   at least one input port and at least one output port for interfacing with an external system.

2. The multimedia carousel of claim 1 wherein said media unit is connected to said base such that it is rotatable about a vertical axis through a center of said media unit and said base.

3. The multimedia carousel of claim 1 further comprising a display control panel disposed on each of said outwardly facing sides of said media unit for controlling selected aspects of said display panel disposed on said outwardly facing side.

4. The multimedia carousel of claim 1 wherein each of said cameras is voice-activated.

5. The multimedia carousel of claim 1 wherein each of said cameras is a charge coupled device ("CCD") camera.

6. The multimedia carousel of claim 1 wherein each of said displays is an active matrix display.

7. The multimedia carousel of claim 1 further comprising an audio control panel associated with said speaker for controlling selected aspects of audio output.

8. The multimedia carousel of claim 1 wherein said external system is a video conferencing system.

9. The multimedia carousel of claim 1 wherein said external system is a multimedia computer.

10. The multimedia carousel of claim 1 wherein said media unit comprises four sides.

11. The multimedia carousel of claim 1 wherein said media unit comprises three sides.

12. The multimedia carousel of claim 1 wherein said outwardly facing sides are connected via hinges at all but one corner of said media unit and connected by latching means at the remaining corner of said media unit.

13. A multimedia carousel having a plurality of outwardly facing sides comprising:
   a display panel disposed on each of said outwardly facing sides;
   a camera associated with each of said outwardly facing sides;
   a microphone disposed on each of said outwardly facing sides;
   a speaker; and
   a plurality of input and output ports for interfacing with external systems.

14. The multimedia carousel of claim 13 wherein said speaker is disposed on a top surface of said multimedia carousel and has associated therewith a plurality of controls for controlling various aspects of said speaker's output.

15. The multimedia carousel of claim 13 wherein each of said cameras is a voice-activated charge coupled device ("CCD") camera.

16. The multimedia carousel of claim 13 wherein each of said display panels is an active matrix display.

17. The multimedia carousel of claim 13 wherein said multimedia carousel is rotatable about a vertical axis through a center thereof.

18. The multimedia carousel of claim 13 further comprising a display control panel associated with each of said display panels for controlling selected aspects of said associated display panel.

19. The multimedia carousel of claim 13 wherein said external system is selected from a group consisting of a video conferencing system and a multimedia computer.

20. The multimedia carousel of claim 13 comprising at least three sides.

21. The multimedia carousel of claim 13 wherein said display panels are connected via hinges at all but one corner of said multimedia carousel and connected by latching means at the remaining corner of said multimedia carousel.

22. A multimedia carousel comprising:
   a base;
   a media unit rotatably connected to said base and having a plurality of outwardly facing sides and a top surface, said media unit further comprising an active matrix display, a microphone, and a voice-activated charge coupled device ("CCD") camera disposed on each of said outwardly facing sides and a speaker disposed on said top surface;
   a display control panel associated with each of said active matrix displays for controlling operational aspects of said associated active matrix display;
   a speaker control panel associated with said speaker for controlling operational aspects of said speaker; and
   at least one input port and at least one output port for interfacing with an external system.

23. The multimedia carousel of claim 22 wherein said external system is a video conferencing system or a multimedia computer.

24. The multimedia carousel of claim 22 wherein said media unit has at least three sides.

25. The multimedia carousel of claim 22 wherein said outwardly facing sides are connected via hinges at all but one corner of said media unit and connected by latching means at the remaining corner of said media unit.

* * * * *